United States Patent Office 3,135,354
Patented June 2, 1964

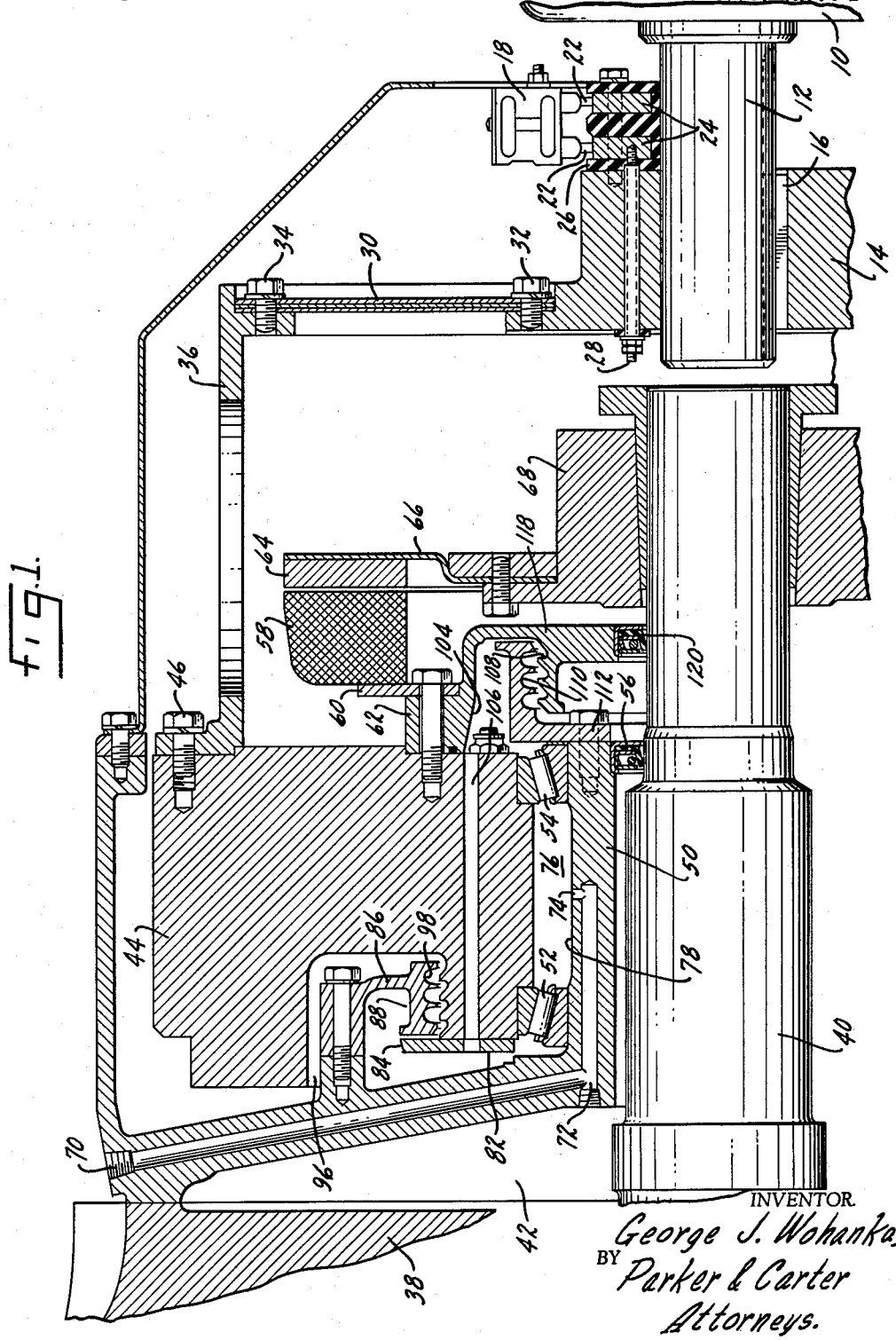

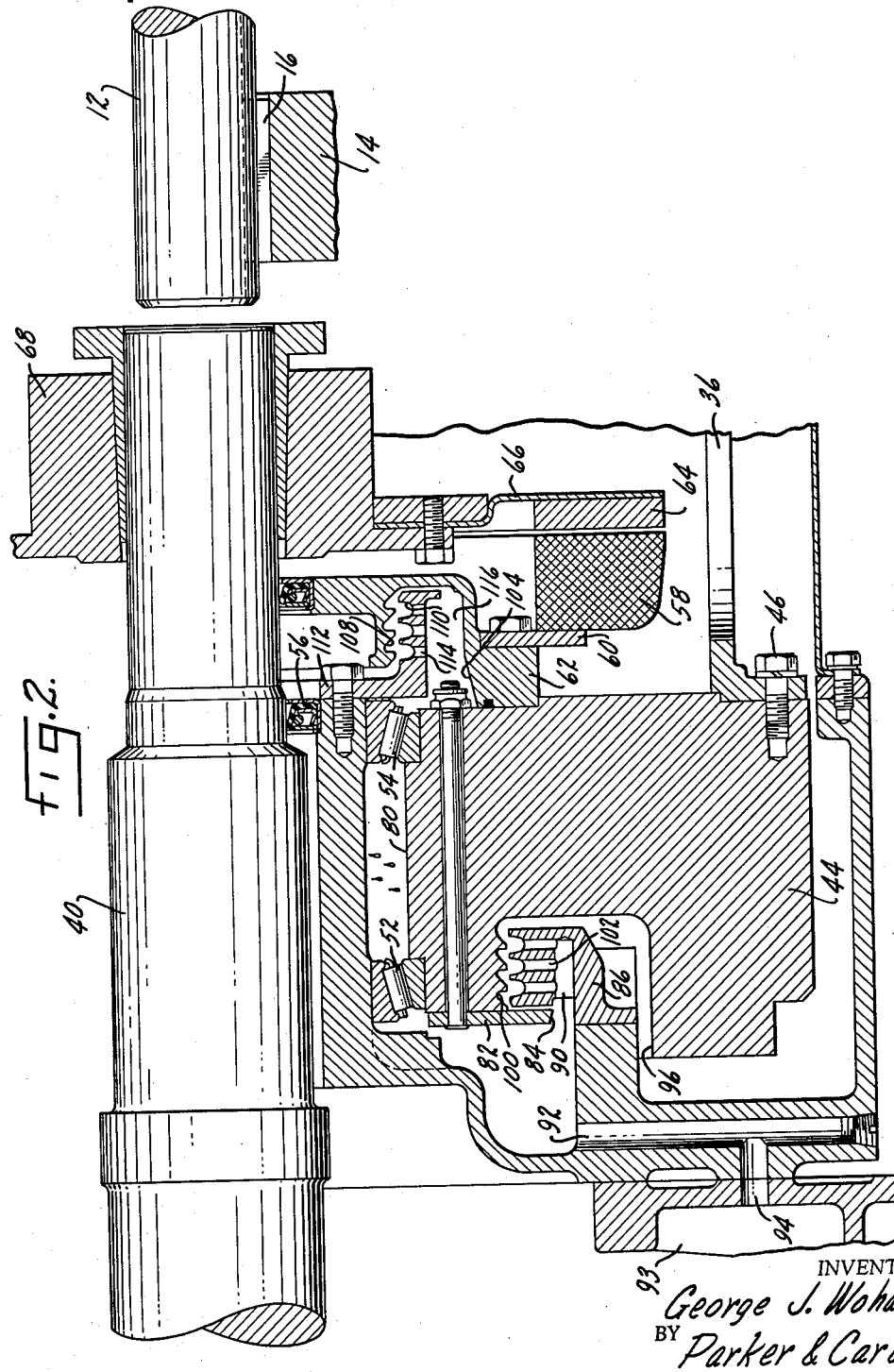

3,135,354
LUBRICATION ARRANGEMENT FOR ENGINE
FLYWHEELS AND THE LIKE
George J. Wohanka, Milwaukee, Wis., assignor to Nordberg Manufacturing Company, Milwaukee, Wis., a corporation of Wisconsin
Filed Apr. 9, 1962, Ser. No. 185,891
9 Claims. (Cl. 184—6)

This invention relates to a bearing lubrication system for use in automatic power plants of the type where a rotating flywheel is used to start a stationary standby engine upon the failure of the normal electric power supply.

A primary purpose of the invention is a means for continuously supplying lubricant to bearings supporting a rotating flywheel upon a stationary concentric surface.

Another purpose is a lubricating system of the type described in which the lubricating oil is continuously supplied to and through the bearings and then is collected at a central point.

Other purposes will appear in the ensuing specification, drawings and claims.

The invention is illustrated diagrammatically in the following drawings wherein:

FIGURES 1 and 2 are axial sections through an engine crankshaft and flywheel arrangement illustrating the invention, with FIGURE 1 showing the upper half of the flywheel and crankshaft, and FIGURE 2 showing the lower half of the flywheel and crankshaft.

Although the invention is described in connection with an automatic power plant which is effective to supply electric power upon failure of the normal power supply, the particular lubricating arrangement shown may be used wherever a flywheel rotates upon a concentric cylindrical surface and it is necessary to lubricate bearings supporting the flywheel.

The power plant may include a starting-generating dynamo 10 which may be any type of unit which functions both as a generator and a motor. For example, a single machine may be wired to operate both as a generator and as a motor, or there may be a separate alternator and a separate motor. In addition, the term includes an alternator and a motor exciter. The novelty of this invention does not reside in the unit 10 and this unit may be any machine combination which is effective to operate as a motor when supplied with electric current and to operate as a generator when driven by a suitable prime mover.

Extending outwardly from the unit 10 is a shaft 12 having a cylindrical drive adapter 14 keyed thereto, as at 16. A brush holder 18 may have a pair of brushes 22 positioned to contact two spaced slip rings 24 which are mounted about the shaft 12. An insulating structure 26 encloses the sides and inner surface of the slip rings to electrically isolate them from the drive adapter 14 and from the shaft 12. An insulated pin 28 extends through the drive adapter 14 and is in electrical contact with the slip rings. The pin 28 may be connected, by wires not shown, to a magnetic pole piece hereinafter described. In operation, the brushes 22 will be supplied with electric current through a switch, not shown, when there is a failure in the normal electrical supply to the power station. The current supplied to the brushes will be transferred by the slip rings and insulated pin to the magnetic pole piece to operate a magnetic clutch as described hereinafter.

A cylindrical coupling 30, which may be laminated, is fastened by screws or the like 32 to the drive adapter 14 and by screws 34 to a cylindrical coupling adapter 36.

A prime mover, which may be a gasoline engine, or otherwise, is indicated generally at 38 and has an outwardly extending engine crankshaft 40 and a frame indicated generally at 42. Adjacent the frame 42 and in radial alignment with a portion of the crankshaft 40 is a cylindrical flywheel 44. The flywheel is connected to the coupling adapter 36 by means of screws or the like 46 and is driven by the shaft 12 through the drive adapter and the coupling adapter. The flywheel will rotate when the unit 10 is supplied with electric power and is operating as a motor.

A cylindrical engine frame extension 50 extends along the crankshaft 40 and mounts the flywheel 44 through a pair of axially spaced bearings, the left-hand bearing being designated at 52 and the right-hand bearing being designated at 54. A seal 56 may be positioned between the frame extension 50 and the crankshaft 40, as desired.

Extending axially outwardly from the flywheel 44 is a suitable cylindrical magnetic pole piece 58 which is mounted to the flywheel by a cylindrical plate 60, which in turn is bolted to the flywheel and to a generally cylindrical bracket 62. Positioned outwardly of the magnetic pole piece 58 is a generally cylindrical armature 64 which may be mounted on a somewhat flexible generally circular plate 66, which in turn is fastened to an adapter 68 keyed to the outer end of the engine crankshaft. In operation, the magnetic pole piece may include a conventional coil, which is connected through wires, not shown, to the insulated pin 28 so that electrical current may flow to the magnetic pole piece and induce a magnetic field therein. This magnetic field provides sufficient attractive force to move the armature 64 to contact with the pole piece and thereby to connect the flywheel to the engine crankshaft.

This invention is principally concerned with a means for lubricating the bearings supporting the flywheel 44. The details of the clutch and drive mechanism for the engine may be found in the application of James K. Valus, Serial No. 35,565, filed June 13, 1960, and entitled "Engine Flywheel Structure." Other types of clutches may be satisfactory and the invention should not be limited to the clutch shown in the said application. A clutch of the type shown in the application of Everett Chapman, Serial No. 57,184, filed September 20, 1960, entitled "Magnetic Clutch," is also satisfactory.

The engine frame 42 may have an inlet port 70 which is connected to a generally axially extending passage 72 in the frame extension 50. The passage 72 opens into a generally radially extending port 74 which is in communication with the space 76 between the bearings 52 and 54. Oil will flow in a general circumferential direction on the surface 78 of the frame extension 50 until it drips off the bottom of the surface 78 onto the opposing surface 80 of the flywheel 44. Oil will flow axially in both directions on the surfaces 78 and 80 to lubricate the bearings 52 and 54.

Considering the left-hand bearing 52 first, after the oil passes through the bearing it will flow radially outwardly along the outside surface of a slinger ring 82. It will move outwardly along the slinger ring until it flies off the peripheral edge 84 onto a fixed bracket 86 which is a part of the engine frame. The bracket 86 may have a peripheral groove 88 which collects the oil which then flows circumferentially downwardly around each side to a bottom chamber 90. The chamber 90 is in communication with a downwardly directed passage 92 and with the engine sump 93 through a port 94. In this way, the oil used to lubricate the bearings may be engine oil and it will be returned to the engine sump.

The fixed bracket 86 extends into a hollow portion 96 of the flywheel. The inside cylindrical surface of the bracket 86 may have a plurality of closely and preferably equally spaced grooves 98 which are positioned opposite a plurality of closely and preferably equally spaced grooves 100 on the outside cylindrical surface of the hollow flywheel portion 96. The radial extensions defining the grooves 98 and 100 do not overlap so that there is no problem fitting the flywheel about the stationary bracket 86. When oil collects in the grooves 100, it will drop into grooves 98 as the flywheel rotates and will then pass down through passages 102 into the chamber 90 and from there to the engine sump. The oil flows to and through the bearing 52, then down over the outside surface of the slinger ring and through one or more different paths into the chamber 90 and hence to the engine sump.

Considering the right-hand bearing 54, the oil flowing through this bearing will be thrown against a somewhat tapered surface 104 formed on the adapter or bracket 62 mounting the magnetic pole piece 58. The oil collecting on the surface 104 will be directed through any one of a number of axially extending passages 106 in the flywheel which open to the outside of the slinger ring 82. The oil will then follow the same path, as described before, down through the port 94 and into the engine sump 93. The inside cylindrical surface of the bracket 62 may have a plurality of grooves 108, similar to the grooves 100 on the flywheel. These grooves are generally in radial alignment with a plurality of grooves 110 formed on the outer cylindrical surface of an extension 112 of the frame portion 50. Each of the grooves 110 may have a port 114, on the lower side of the extension 112, which opens into a chamber 116, a portion of which is formed by the slanted surface 104. In this way, any oil collecting in the grooves 108 will flow through the ports 114 and then to the slanted surface 104 and across to the opposite side of the flywheel.

The bracket 62 may have a flange 118 which surrounds the crankshaft 40 and carries a suitable seal 120 which bears against the crankshaft. The flange 118 prevents air from circulating about the outside of the flywheel, through passages 106, between grooves 108 and 110, and thus outside of the unit. Because of the speed of the flywheel, this air would have a high velocity and would suck the lubrication out of the system.

The use, operation and function of the invention are as follows:

The present invention provides an improved lubricating arrangement for the bearings supporting a flywheel which rotates around a stationary surface. The arrangement of parts shown herein provides a continuous path for the lubricant so that it runs to and through the bearings and then to a collection point. The collection point may be the engine sump or it may be otherwise. In any event, once the oil is collected, it may be cooled, filtered, and then reused. A suitable pump or the like, not shown, may be used to circulate the oil.

As shown herein, the invention is applied to a flywheel which rotates about a frame extension on a standby engine. Under normal operating conditions the engine will be stationary, or not operating, and the flywheel will be rotating about the frame extension. When it is desired to start the engine, a magnetic clutch or some other form of clutch will be used to directly couple the rotating flywheel to the stationary engine crankshaft. The inertia of the flywheel will then start the engine so that the engine in turn may drive the unit 10 as a generator. In this way, the unit 10 will supply electric power. Under normal operating conditions the unit 10 will be operating as a motor and will drive the flywheel 44.

The present invention is particularly advantageous in that it circulates the lubricating oil. Power plants of this type may be at remote locations and only serviced periodically. The flywheel rotates at all times and its bearing lubrication can be a source of trouble. The present invention provides a continuous flow of clean oil at a proper temperature.

Whereas the preferred form of the invention has been shown and described herein, it should be realized that there are many modifications, substitutions and alterations thereto, within the scope of the following claims.

I claim:

1. A power plant including an engine having a frame and a crankshaft, a flywheel concentric with said crankshaft and supported on said frame, bearings positioned between said flywheel and frame so that the flywheel is freely rotatable relative to the frame, means for coupling said flywheel to said crankshaft, means for driving said flywheel, and means for providing a continuous flow of lubricant to and through said bearings, including an oil path through the frame, through the bearings, and then to the engine oil sump.

2. The structure of claim 1 further characterized by a stationary bracket extending within a hollow portion of the flywheel and arranged to catch oil flowing radially outward along a radial surface of the flywheel after it has left the bearings.

3. The structure of claim 1 further characterized in that said bearings are axially spaced, and a passage in said frame opening into the space between said bearings to provide oil thereto.

4. The structure of claim 3 further characterized in that oil flows axially in both directions toward said bearings, then flows through said bearings, and then flows radially outwardly along radial surfaces of said flywheel.

5. The structure of claim 1 further characterized by an axially extending passage in said flywheel for bringing oil from one side of the flywheel to the other.

6. The structure of claim 1 further characterized in that said bearings are axially spaced one from another, said last named means including a passage in said frame for introducing oil between said bearings, said bearings being positioned near the radial surfaces of said flywheel, with the oil flowing outwardly along said radial surfaces after it has passed through said bearings.

7. The structure of claim 6 further characterized by means at the side of said flywheel away from said engine for collecting oil after it has passed through a bearing, and a passage in said flywheel for carrying the oil from the side of the flywheel away from the engine to the side of the flywheel closest to the engine.

8. The structure of claim 1 further characterized in that said named means includes a passage in said engine frame in communication with said bearings and with the engine oil sump.

9. A power plant including an engine having a frame and a crankshaft, said frame having a stationary portion concentric with said crankshaft and closely spaced thereto, a flywheel concentric with said crankshaft and supported on said frame portion for rotation about said frame portion and crankshaft, a pair of spaced bearings positioned between said flywheel and frame portion so that the flywheel is freely rotatable relative to the frame portion, means for coupling said flywheel to the crankshaft, means for driving said flywheel, and means for providing a continuous flow of lubricant to and through said bearings including an oil passage in the frame portion for introducing oil between said bearings, and means for collecting oil after it has left the bearings.

References Cited in the file of this patent

UNITED STATES PATENTS

| | | |
|---|---|---|
| 1,685,517 | Baldwin | Sept. 25, 1928 |
| 1,883,422 | Strong | Oct. 18, 1932 |
| 2,374,990 | Gilbert | May 1, 1945 |
| 2,586,617 | Danly | Feb. 19, 1952 |
| 2,919,962 | Hencken et al. | Jan. 5, 1960 |